(12) United States Patent
Zhu et al.

(10) Patent No.: US 9,756,460 B2
(45) Date of Patent: Sep. 5, 2017

(54) ADAPTIVE LOCATION PERTURBATION

(71) Applicant: HEWLETT-PACKARD DEVELOPMENT COMPANY, L.P., Houston, TX (US)

(72) Inventors: Jindan Zhu, Davis, CA (US); Kyu-Han Kim, Palo Alto, CA (US); Prashant Mohapatra, Davis, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/899,810

(22) PCT Filed: Jun. 21, 2013

(86) PCT No.: PCT/US2013/047050
§ 371 (c)(1),
(2) Date: Dec. 18, 2015

(87) PCT Pub. No.: WO2014/204487
PCT Pub. Date: Dec. 24, 2014

(65) Prior Publication Data
US 2016/0150361 A1  May 26, 2016

(51) Int. Cl.
*H04W 4/02* (2009.01)
*G08G 1/01* (2006.01)
(Continued)

(52) U.S. Cl.
CPC ............ *H04W 4/02* (2013.01); *G01C 21/005* (2013.01); *G01C 21/30* (2013.01); *G01C 21/3484* (2013.01); *G01C 21/3492* (2013.01); *G01S 5/0263* (2013.01); *G01S 19/14* (2013.01); *G01S 19/48* (2013.01); *G08G 1/0112* (2013.01); *G08G 1/0129* (2013.01); *H04K 3/00* (2013.01); *H04K 3/65* (2013.01); *H04K 3/825* (2013.01);
(Continued)

(58) Field of Classification Search
CPC ..... H04W 64/00; H04W 64/003; H04W 4/02; H04W 4/021; H04W 4/025; H04W 4/028; H04W 12/02; H04W 4/023; H04W 8/16
See application file for complete search history.

(56) References Cited

U.S. PATENT DOCUMENTS

2003/0130893 A1    7/2003   Farmer et al.
2009/0177603 A1    7/2009   Honisch
(Continued)

FOREIGN PATENT DOCUMENTS

WO    WO-2013/036421 A1    3/2013

OTHER PUBLICATIONS

International Search Report and Written Opinion, International Application No. PCT/US2013/047050, Date: Mar. 24, 2014, pp. 1-8.
(Continued)

*Primary Examiner* — Nam Huynh
(74) *Attorney, Agent, or Firm* — Hewlett Packard Enterprise Patent Department (57) ABSTRACT

An example of adaptive location perturbation can include selecting, by a processing resource of a mobile device executing instructions stored on a non-transitory medium, between a plurality of localization technologies to perturb a location measurement of the mobile device. The perturbed location measurement of the mobile device can be sent to a location-based service provider.

20 Claims, 6 Drawing Sheets

(51) Int. Cl.
| | |
|---|---|
| *G01S 19/14* | (2010.01) |
| *G01S 19/48* | (2010.01) |
| *G01S 5/02* | (2010.01) |
| *H04L 29/08* | (2006.01) |
| *G01C 21/34* | (2006.01) |
| *G01C 21/00* | (2006.01) |
| *H04W 12/02* | (2009.01) |
| *H04L 29/06* | (2006.01) |
| *G01C 21/30* | (2006.01) |
| *H04K 3/00* | (2006.01) |
| *H04W 64/00* | (2009.01) |

(52) U.S. Cl.
CPC ............ *H04K 3/90* (2013.01); *H04L 63/1475* (2013.01); *H04L 63/1491* (2013.01); *H04L 67/306* (2013.01); *H04W 4/028* (2013.01); *H04W 12/02* (2013.01); *H04W 64/00* (2013.01); *H04K 3/41* (2013.01); *H04K 3/43* (2013.01); *H04K 3/94* (2013.01); *H04K 2203/16* (2013.01)

(56) References Cited

U.S. PATENT DOCUMENTS

| | | |
|---|---|---|
| 2010/0064373 A1 | 3/2010 | Cai et al. |
| 2012/0009897 A1 | 1/2012 | Kasad et al. |
| 2012/0197873 A1 | 8/2012 | Uramoto et al. |
| 2012/0220308 A1 | 8/2012 | Ledlie |
| 2012/0225677 A1 | 9/2012 | Forstall et al. |
| 2012/0276925 A1 | 11/2012 | Pitt |
| 2012/0309350 A1 | 12/2012 | Kim et al. |
| 2013/0184012 A1* | 7/2013 | Gupta .................. H04W 64/00 455/456.6 |
| 2014/0171109 A1* | 6/2014 | Segev .................. G01S 5/0027 455/456.1 |

OTHER PUBLICATIONS

Jindan Zhu et al., "An Adaptive Privacy-Preserving Scheme for Location Tracking of a Mobile User," IEEE International Conference on Sensing, Communication, and Networking, Jun. 24-27, 2013, New Orleans, LA, USA, pp. 1-9.

M. Razvi Doomun, "Dynamic Location Privacy Mechanism in Location-Aware System," 2007, pp. 379-384, Springer Netherlands.

Toby Xu and Ying Cai "Feeling-based Location Privacy Protection for Location-based Services," CCS'09, Nov. 9-13, 2009, Chicago, Illinois, USA, pp. 348-357, ACM.

Ardagna, C. A., et al; "Protecting Privacy of User Information in Continuous Location-Based Services"; Dec. 5, 2012; 8 pages.

European Search Report issued in Appl. No. 13887491.2; mailed Feb. 9, 2017; 12 pages.

Krumm, J.; "A Survey of Computational Location Privacy"; Aug. 1, 2999; 9 pages.

Shokri, R., et al; "Quantifying Location Privacy"; May 22, 2011; 16 pages.

* cited by examiner

ADAPTIVE LOCATION PERTURBATION

BACKGROUND

Applications associated with a mobile device may monitor and share location information concerning the device, sometimes at continuously recurring intervals. However, disclosing a mobile device's location may lead to disclosing sensitive information about daily activity of the user of the mobile device.

Several schemes for preserving location privacy in order to mitigate this threat have been proposed. However, it may remain challenging to, for instance, obscure the location of the mobile device while maintaining suitable operability of the mobile device.

DETAILED DESCRIPTION

This present disclosure describes various examples of an adaptive location perturbation system (ALPS). Some examples presented herein describe an application associated with (e.g., hosted at and/or coupled with) a mobile device that allows for a user of the mobile device to control a level of privacy disclosure by selective variation between using a plurality of localization technologies each having a different inherent precision (e.g., accuracy) of localization of the mobile device (e.g., by geodetic positioning and/or on a saved map, etc.). As described herein, perturbation of location measurements of the mobile device can be contributed to by selection from the plurality of localization technologies and/or by subsequent modification of the perturbed location measurements by creation of a conformed location measurement.

Location-based services (LBSs) offered by LBS providers can vary from requesting and recording a single location measurement (e.g., in response to a service query) to requesting and recording a trajectory (e.g., a trace) of periodically generated and/or received location measurements, for instance, in performing tasks such as trajectory sharing, participatory sensing, and destination/intention predicting, among others. However, such documentation of locations can introduce a dimension of complexity for users who want to control the privacy of such recorded locations. Furthermore, users of LBSs may prefer personalized privacy protection in tracing of their location trajectories, in which a profile (e.g., a personalized privacy preference profile) can be adaptively adjusted for individual segments in a trajectory (e.g., areas, regions, etc., in a trajectory potentially transited by the mobile device and, thus, the user) in order to achieve a balance between privacy and quality of service (QoS) within the trajectory. As described herein, mobile device can, for example, be a portable telephone, such as a cellular phone, a smartphone, a personal computer, a personal digital assistant, a tablet, a notebook, a computing system in a vehicle, etc.

As used herein, QoS can relate to various parameters that define a quality of a response from an LBS. Such parameters that define the Qos can include, for example, accuracy and/or precision of the location information provided by an LBS, correctness of a service provided by the LBS (e.g., zip code determination, restaurant identification and/or information, etc.), and/or accuracy and/or precision of a trajectory or destination associated with a trajectory.

Particular locations (areas, regions, etc.) may be deemed "sensitive" by the user and, thus, higher level of privacy (e.g., a higher magnitiude of perturbations) can be enforced (e.g., by a processor and/or application) in compliance with the profile settings, whereas other locations (areas, regions, etc.) may be deemed "insensitive" by the user and, thus, a lower level of privacy (e.g., a lower magnitude of perturbations) can be enforced in compliance with the profile settings (e.g., in locations where QoS of the LBS provider is an important consideration, among other reasons).

Striking such a balance to maintain QoS without violating the user's privacy preference over a length of the trace's trajectory has previously been difficult to achieve. On the other hand, advances in map-matching technology may impose a more challenging issue, for instance, in keeping a user's location, trajectory, and/or selected locations and/or areas transited in the trajectory from being deciphered by and/or for an unintended party (e.g., an adversary).

Accordingly, the present disclosure describes an ALPS that allows a user to dynamically and adaptively control levels of location and/or trajectory privacy disclosed to an LBS provider and/or potentially to an adversary. The ALPS can include a non-transitory computer-readable medium storing program instructions thereon that is operable on a mobile device and that provides context-aware perturbation mechanisms as well as attack emulation capability for privacy preservation and potential privacy threat quantification.

The ALPS can, in various examples, take a two-tier approach to perturbation, in which the ALPS in a first separation tier injects artificial perturbations into a location measurement trajectory and then, in a second conformation tier, conforms and smoothens the perturbed location measurement trajectory to mitigate against hints of the perturbation that might be useful to a potential adversary in detecting and/or deciphering the perturbation. The ALPS can, in various examples, provide a number of controls (e.g., dials, knobs, switches, sliders, etc.) for the separation tier and/or for the conformation tier, allowing for a user to adaptively adjust the privacy levels proactively and/or reactively. Furthermore, as described herein, the ALPS can utilize contextual information and previous location release history by integrating them into various adversary simulators, in order to estimate potential privacy threats as well as to provide a user feedback to adjust privacy settings.

An example of adaptive location perturbation can include selecting, by a processing resource of a mobile device executing instructions stored on a non-transitory medium, between a plurality of localization technologies to perturb a location measurement of the mobile device. The perturbed location measurement of the mobile device can be sent to an LBS provider.

In the present disclosure, reference is made to the accompanying drawings that form a part hereof and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Similar elements or components appearing in different figures may be identified by the use of similar digits. For example, 111 may reference element "11" in FIG. 1 and a similar element may be referenced as 211 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a", "at least one", or "a number of" an element can refer to one or more of such elements. Further, where appropriate, as used herein, "for example" and "by way of example" should be understood as abbreviations for "by way of example and not by way of limitation".

Figure 1:
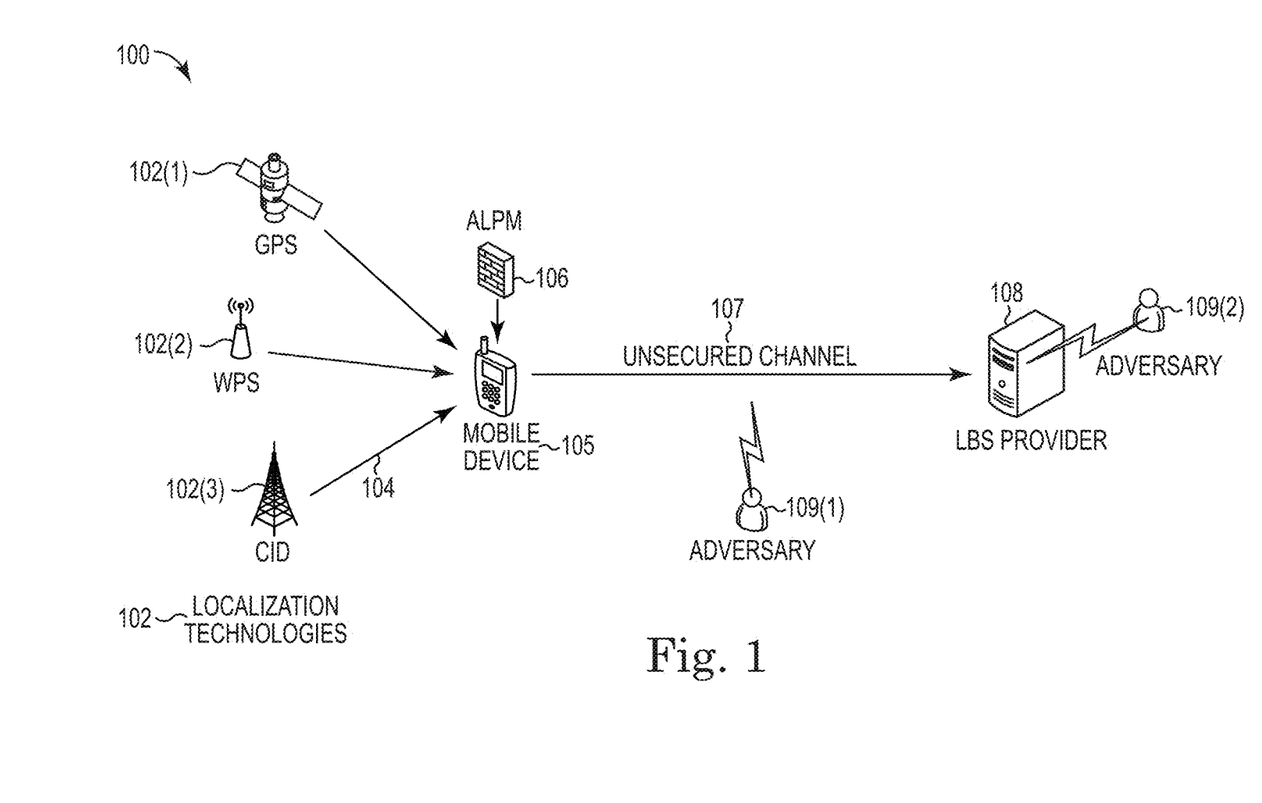
FIG. 1 illustrates an example of utilization of adaptive location perturbation according to the present disclosure.

FIG. 1 illustrates an example of utilization of adaptive location perturbation according to the present disclosure. The example of the ALPS 100 illustrated in FIG. 1 is shown to include a plurality of localization technologies 102. The plurality of localization technologies 102 are available for selection, as described herein, by a mobile device 105 and/or an adaptive location perturbation mechanism (ALPM) 106 associated with (e.g., hosted at and/or coupled with) the mobile device 105.

Localization technologies that can contribute to the plurality can include, for example as shown in FIG. 1, a Global Positioning System (GPS) 102(1), a Wi-Fi Positioning System (WPS) 102(2), and a Cellular-ID look-up (CID) 102(3), although more or less than three localization technologies can contribute to the plurality. Moreover, localization technologies other than those just presented can be used instead of and/or in addition to those just presented. That is, any service that can provide a location measurement 104 to a user, the mobile device 105, and/or the ALPM 106 can be included among the plurality of localization technologies 102. Location measurements 104 can include, for example, a time of each measurement and an estimate of the position of the location being measured (e.g., by geodetic positioning, such as latitude and longitude) for the mobile device 105 as determined by a selected localization technology. Other usable and/or selectable localization technologies include an IP address reverse look-up, a ZIP code, and manual input by the user, among others. As described further herein, each of these localization technologies provides a location measurement 104 with a different accuracy and granularity estimation of the actual position of the mobile device 105, combination of which (e.g., via the ALPM 106) is utilized to perturb the location measurement of the mobile device sent to the LBS provider 108.

As described herein, a location measurement 104 or a series of location measurements can be received and/or processed (e.g., perturbed) by the mobile device 105 and/or the ALPM 106. The perturbed location measurement or the perturbed series of location measurements can be sent over an "insecure" channel 107. Examples of sending the perturbed location measurement or the series of perturbed location measurements over an insecure channel 107 can include sending as electromagnetic signals through a cable, sending the location measurements as photonic signals through an optical fiber, and/or transmitting electromagnetic signals to an antenna, such as a cell tower, or a satellite, among other possibilities. The perturbed location measurement or the series of perturbed location measurements can be sent over the insecure channel 107 to the LBS provider 108. Being "insecure" can indicate that a channel is unsecured, insufficiently secured relative to an attack, or otherwise vulnerable to an attack. For example, the insecure channel 107 may be susceptible to interception by a potential adversary 109(1) (e.g., a person and/or mechanism that can "eavesdrop") capable of monitoring, collecting, and/or interpreting information (e.g., derived from the location measurements 104) sent and/or transmitted over the insecure channel 107 (e.g., due to lack of effective mechanisms to safeguard privacy of the information).

The LBS provider 108 can provide various services to the user through the mobile device 105 that depend on or are improved by a determination of a geodetic position of the mobile device 105 (e.g., cellular telephone service, short message service, among others). The LBS provider 108 may be trusted by a user to perform various services that can include determining and/or keeping track of the location of the user's mobile device 105 at the time of each location measurement 104. However, similar to the insecure channel 107, the LBS provider 108 may be and/or provide an insecure destination, service, and/or repository such that the LBS provider 108 may not be worthy of being "entrusted" by a user having possession of the mobile device 105 at the time of each location measurement 104 to keep such information private. That is, through various means, an adversary 109(2) may potentially gain access to information derived from the perturbed location measurements that are received and/or stored by the LBS provider 108 (e.g., memory and/or processing resources in a number of devices of the LBS provider 108). As such, the adversary 109(2) may obtain unauthorized access to the "untrusted" LBS provider 108, may be authorized to access the "untrusted" LBS provider 108 (e.g., as a client different from the user of the mobile device 105), and/or may be personnel and/or devices associated with the "untrusted" LBS provider 108 that provide such information to and/or act as the adversary 109(2), among other possibilities.

As described herein, any party that may have access to location information sent from the mobile device 105 to the LBS provider 108 (e.g., unperturbed and/or perturbed location information, such as measurements, updates, etc.) is assumed to be a potential adversary. An objective of an adversary can be to reconstruct an actual trajectory of a user from a sequence of perturbed location measurements sent by the mobile device 105. The adversary may also be interested in extracting personalized privacy preferences of the mobile user (e.g., by analyzing density, transitions, and/or turbulence of perturbations in a perturbed trajectory, as described herein). As also described herein, various automated map-matching processes can be used by adversaries to extract such information. Various processes and functionalities for reducing the accuracy of such map-matching processes usable by the adversaries are presented herein. Some examples discussed in the present disclosure concern adversaries that potentially obtain a user's location and/or trajectory information after being electromagnetically sent (e.g., after perturbation), rather than adversaries that actively collect the user's location and/or trajectory information through means such as stalking or engineered encounters.

Figure 2:
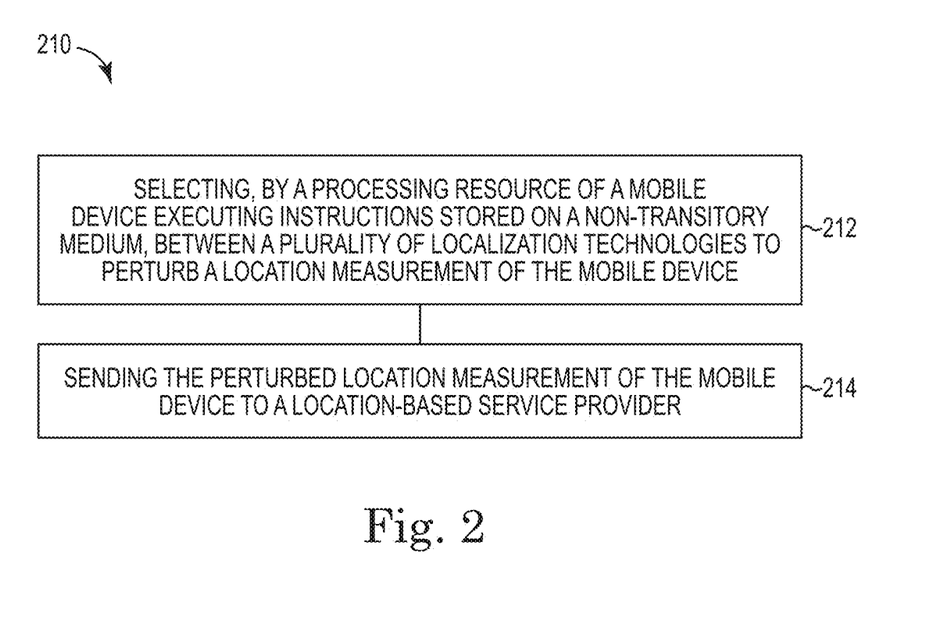
FIG. 2 illustrates an example of a method for adaptive location perturbation according to the present disclosure.

FIG. 2 illustrates an example of a method for adaptive location perturbation according to the present disclosure. Unless explicitly stated, the method examples described herein are not constrained to a particular order or sequence. Additionally, some of the described method examples, or elements thereof, can be performed at the same, or substantially the same, point in time. As described herein, the actions, functions, calculations, data manipulations and/or storage, etc., can be performed by execution of machine readable instructions stored in a number of memories (e.g., software, firmware, and/or hardware, etc.) of a number of applications. As such, a number of computing resources with a number of processors can be utilized for adaptive location perturbation and related functions, as described herein.

Adaptive location perturbation 210 can include, as shown in block 212 of FIG. 2, selecting, by a processing resource of a mobile device executing instructions stored on a non-transitory medium, between a plurality of localization technologies to perturb a location measurement of the mobile device. As described herein, the location measurement of the mobile device describes an estimated measurement of the position of the mobile device (e.g., by geodetic positioning and/or on a saved map, etc.) at a particular time that is provided by a selected localization technology.

For example, a software, firmware, and/or hardware application encoded with program instructions (e.g., code) to be executable by a processor to perform the process. The encoded program instructions can, in various examples, be stored on a transferable, portable medium (e.g., a compact disk, a digital versatile disk, a flash drive, among others) and/or on a server (e.g., in memory) from which the encoded program instructions can be downloaded and installed. For example, the encoded program instructions can be associated with (e.g., hosted at and/or coupled with) the ALPM 106 the mobile device 105, shown in FIG. 1. In various examples, such encoded program instructions can be downloaded and/or integrated prior to release of the mobile device to consumers. Alternatively or in addition, such encoded program instructions can be downloaded and/or provided to a user for update of the adaptive location perturbation processes described herein that are executable on the mobile device.

Perturbation of the location measurement of the mobile device can be accomplished, at least in part, by selecting between a plurality of localization technologies, as illustrated in FIG. 1, for example. The effectiveness of the perturbation is contributed to by characteristics such as error (e.g., caused by noise) in a measurement of the location. That is, for example, noise in the location measurement can cause an error, which affects the accuracy and/or precision of the location measurement. As such, location measurement error can be caused by an intrinsic noise in each of the localization technologies, which can be roughly characterized by accuracy of the location measurement determined at least partially through field survey. There are multiple localization technologies readily available to a mobile device and each of them can have diversities in accuracy (e.g., precision in localization of a location measurement to an actual geodetic position of the mobile device) and/or granularity (e.g., fineness of detail, for example, on a map). Such diversity can be used to facilitate the perturbation of the location measurement of the mobile device, which can contribute to personalized privacy for the user or the mobile device.

As such, the ALPS described herein utilizes the intrinsic location measurement errors from these different localization technologies for perturbation. The magnitude of perturbation can be controlled by choosing which localization technology the location measurement or measurements (e.g., as shown at 104 in FIG. 1), and thus the noise, are coming from. For example, the three localization technologies shown in FIG. 1, that is, GPS 102(1), WPS 102(3), and CID 102(3), can offer an estimated 10 meter, 100 meter, and 500 meter range of accuracy, respectively (e.g., the localization technologies having differing magnitudes of intrinsic location measurement error in the localization technologies made available for public access, as opposed, for instance, to localization technologies not publicly available, such as military GPS, etc.). For each location measurement (e.g., performed periodically, based upon a query and/or request for a location-based service, etc.), one of the plurality of localization technologies is selected.

The magnitude of perturbation at a macro scale can be controlled probabilistically by a proportional parameter (PP) (e.g., stored in memory of the mobile device 105 and/or the ALPM 106). The PP can be a set of probabilities specifying a proportion of a number of chances that each of the localization technologies will be selected for the location measurement, and therefore as a contributor to the perturbation of the location measurement. For instance, a PP of 20/40/40 can define for a location measurement a 20% chance of obtaining a location measurement from GPS and a 40% chance from each of WPS and CID.

Actual selection from the plurality of localization technologies can be randomized. For example, randomization can be achieved by generation of a random number (e.g., by a processor) that will fall into a range of values, corresponding to the PP, assigned to each of the plurality of localization technologies, among other possibilities for randomization.

Context-aware adaptability of a profile (e.g., a personalized profile indicative of a user's privacy preferences stored in memory) can favor a higher probability of selecting and/or switching to a location measurement performed by a less accurate localization technology (e.g., CID) when the mobile device is in a location (e.g., area, region, etc.) determined to be sensitive (e.g., having an elevated desire for non-disclosure to a potential adversary) by the user. When the context-aware adaptable profile is shifted from privacy (e.g., higher perturbation and/or less accuracy in a sensitive location) to accuracy (e.g., higher accuracy and/or less perturbation in an insensitive location, possibly to improve QoS of the LBS for the mobile device), an accurate localization technology (e.g., GPS) can be favored, for example, by adjustment of the PP in the profile. QoS for or of the mobile device (or QoS of an LBS for a mobile device) refers to the QoS provided by an LBS about that mobile device. Typically, this QoS is based on the accuracy or precision of the location measurements (e.g., perturbed location measurements) of the mobile device that are provided to the LBS provider.

As shown in block 212 of FIG. 2, the perturbed location measurement of the mobile device can be sent to the LBS provider. For example, the perturbed location measurement can be sent to the untrusted LBS provider 108 shown in FIG. 1. For example, the mobile device can include a GPS receiver that can receive coordinates of cell towers and signal strengths to calculate a location measurement or the mobile device can send WiFi media access control (MAC) addresses and signal strengths to a service that returns a location measurement. Such location measurements can be used as the perturbed location measurement, as described herein, and can be sent to the untrusted LBS provider 108. The untrusted LBS provider 108, along with the insecure channel 107 through which location information (e.g., the number of perturbed location measurements) is sent, may potentially be subject to unauthorized access by a number of adversaries (e.g., adversaries 109(1) and 109(2) shown in FIG. 1).

Accordingly, in some examples, selecting between the plurality of localization technologies can include adaptively selecting between localization technologies that have differing magnitudes of location measurement error. As such, adaptively selecting between the plurality of localization technologies can, in various examples, include increasing a probability of a location measurement in a selected location (e.g., area, region, etc.) by a localization technology having a relatively high magnitude of location measurement error compared to other localization technologies.

In some examples, adaptively selecting between the plurality of localization technologies can include context-aware selecting to increase perturbation of the location measurement of the mobile device in the selected location (e.g., area, region, etc.). In some examples, adaptively selecting between the plurality of localization technologies can include increasing a magnitude of the location measurement perturbation (e.g., by adjusting the PP) in the selected location (e.g., area, region, etc.).

In various examples, adaptive location perturbation can include adaptively switching between the plurality of localization technologies to perturb at least one of a plurality of locations measured by the plurality of localization technologies during transit of a trajectory by the mobile device, where tracking of the trajectory is potentially performed by the LBS provider and/or an adversary. As described herein, adaptively switching can include controlling at least one of a frequency of adaptively switching between the plurality of localization technologies and a frequency of sending a location measurement of the mobile device to the LBS provider to mitigate incurred communication costs (e.g., overhead). The ALPS can support various localization technologies and LBS providers, which can involve considerations of energy-aware design. As such, execution of location measurements and/or transmission of location measurements (e.g., updates) can be reduced to control incurring additional data charges (e.g., energy and/or communication overhead) on a user of the mobile device.

Perturbation obfuscates location measurements by enabling noise to be added in order to intentionally reduce accuracy. Compared to other approaches (e.g., spatial cloaking, etc.), perturbation can reduce the ability of an adversary to make a calculated guess about the actual trajectory as well as perturbation parameters (e.g., as stored in a personalized privacy preference portfolio, as described herein). The added noise can provide a less detectable way to reduce a correlation exhibited between consecutive location measurements in the actual trajectory. It can be difficult for an adversary to decipher the noise and reconstruct the actual trajectory. In addition, by controlling a magnitude of the added noise on a per-measurement basis, personalized privacy preferences can be fulfilled with little computational complexity. Since perturbation can be performed directly on the original location measurements, additional communication overhead can be reduced.

Figure 3:
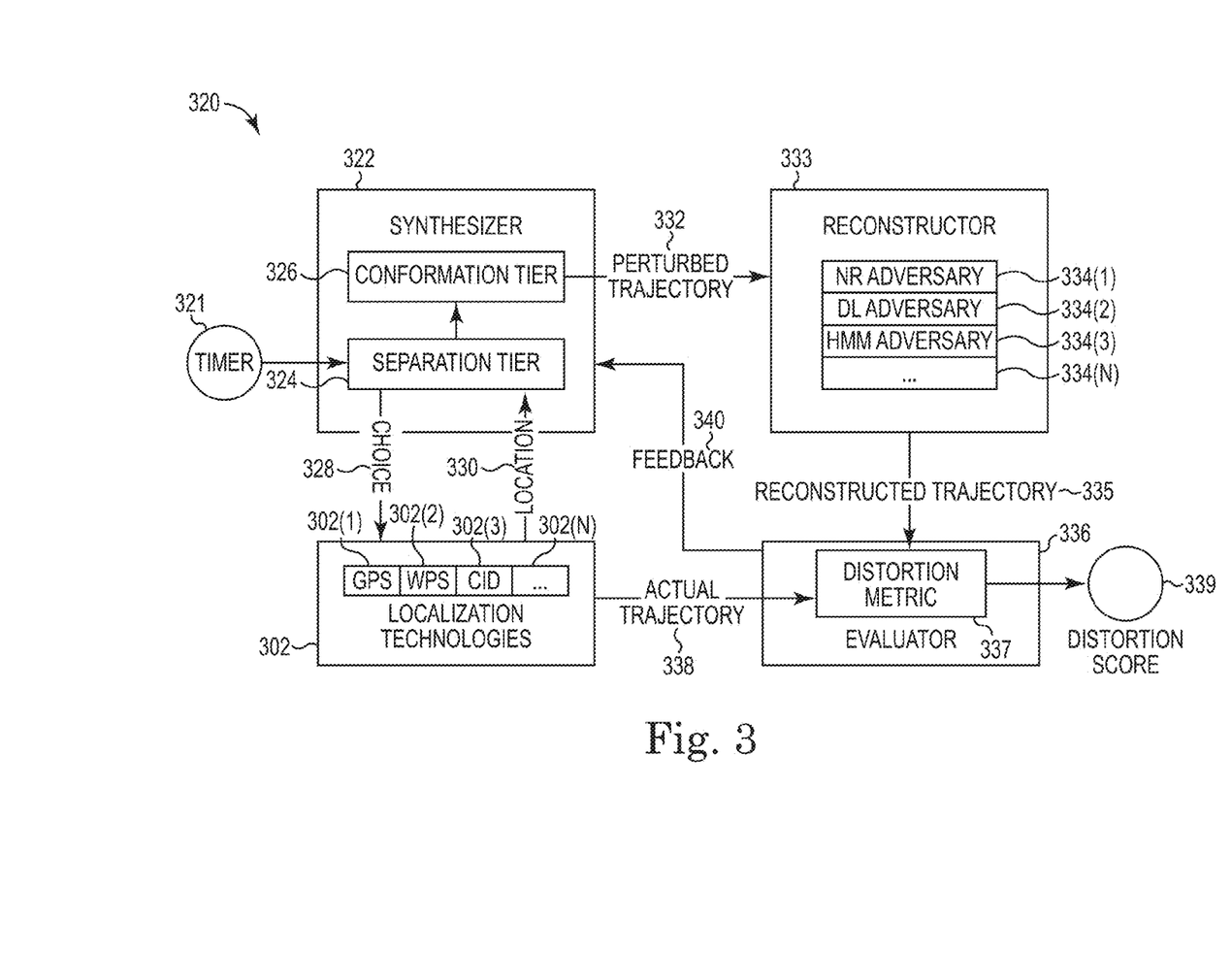
FIG. 3 illustrates an example of a system for adaptive location perturbation according to the present disclosure.

FIG. 3 illustrates an example of a system for adaptive location perturbation according to the present disclosure. As illustrated in FIG. 3, the example ALPS 320 for adaptive location measurement perturbation can include a timer 321 for determining and/or directing location measurements (e.g., at predetermined and/or periodic time intervals, based on a query to the LBS provider, etc.) of a mobile device (not shown). The timer 321 can be connected to a synthesizer 322.

The timer 321 can, in various examples, be an input register for LBS applications. For example, to provide a service (e.g., that involves tracking of the mobile device), a request for periodic location measurements (e.g., as shown at 104 in FIG. 1) can be registered with the timer 321. The predetermined and/or periodic time intervals for such periodic location measurements can be determined by the particular service provided by the LBS. Triggering such a location measurement can result in selecting between the plurality of localization technologies to perturb the location measurement of the mobile device and sending the perturbed location measurement of the mobile device to the requesting LBS of the LBS provider, as described herein. In various examples, the timer 321 can provide an interface for incorporation of temporal perturbation protocols to effectuate personalized privacy preferences for the user of the mobile device (e.g., overriding a number of location measurement requests from an LBS).

Examples of an ALPS described in the present disclosure can protect privacy of a user's actual transited trajectory (e.g., a trace thereof) by enabling adaptive perturbation of location measurements in real-time and/or following review of a number of the location measurements (e.g., location updates) before transmitting the location measurements to an LBS provider. In some examples, this can be performed using a two-tier perturbation process. FIG. 3 illustrates an example architecture of a two-tier ALPS. In addition to the timer 321, the example ALPS architecture consists of three components (e.g., engines), the synthesizer 322, a reconstructor 333, and an evaluator 336, details of which are presented herein. In some examples, all of the three components (e.g., engines) can be hosted at (e.g., stored in a memory resource of and executed by a processing resource of) a mobile device (not shown). In some examples, one or more of the three components and/or subcomponents thereof can be hosted external to the mobile device (e.g., in a "cloud" resource accessible by the mobile device).

As described herein, there are multiple localization technologies 302 available and/or accessible to a mobile device, and each of them can offer differing accuracies and/or granularities of location measurement. These differences are utilized to facilitate achievement of personalized privacy by adaptive location perturbation. The ALPS uses the location measurement errors from these different localization technologies for the perturbation. The magnitude of the perturbation can be controlled by adaptively selecting a specific localization technology and/or adaptively switching between the plurality of localization technologies. As shown in FIG. 3, the localization technologies can include GPS 302(1), WPS 302(2), and CID 302(3). A number of different localization technologies 302(N) can be included in the plurality of localization technologies 302 in addition to and/or in place of the one or more of the three localization technologies just presented as long as the number of localization technologies is at least two.

The synthesizer 322 shown in FIG. 3 makes a choice 328 between the plurality of localization technologies 302, as described herein, and receives location measurements 330 (e.g., estimates of the actual location of the mobile device), which can, in some examples, be utilized for generating a perturbed trajectory (e.g., trace) of the mobile device. Perturbation as applied independently to individual location measurements may potentially be vulnerable to adversaries using advanced map-matching techniques (e.g., using outlier filtering, etc.). As such, two-tiered location perturbation can be utilized to further complicate a potential adversary's effort to accurately reconstruct a trajectory of the mobile device. For example, for each directed location measurement (e.g., as directed by the timer 321), a first tier 324, termed a separation tier herein, can make a choice 328 of one localization technology (e.g., GPS 302(1), WPS 302(2), CID 302(3), or 302(N)) from among the plurality of localization technologies 302 (e.g., in a probabilistic manner, as described herein) and the separation tier 324 can receive a location measurement 330 from the selected localization technology in response.

The separation tier 324 can output perturbed location measurements (e.g., resulting from switching between localization technologies having differing magnitudes of location measurement error) to a second tier 326, termed a conformation tier herein. The conformation tier 326 can then align a number of location measurements with previous and/or subsequent location measurements in the trajectory to reduce a potential adversary's ability to detect that the trajectory has been perturbed and/or reduce a map-matching ability of the potential adversary (e.g., by implementation of mobility and/or topology rules, among other rules, as described herein).

A user of the mobile device can monitor probable efficacy of reducing the potential adversary's ability to detect and/or map-match the perturbed trajectory 332 (e.g., as output by the conformation tier 326) as a simulated attack through analyses of the perturbed trajectory 332 by a reconstructor 333 and an evaluator 336 (e.g., each executing machine-readable instructions stored in a number of memories) in the ALPS 320. The reconstructor 333 can generate a number of reconstructed trajectories 335 based on the perturbed trajectory 332 according to a number of map-matching models usable by a potential adversary, as described herein. The reconstructor 333 also can allow a user to implement (e.g., by a firmware plug-in, wired and/or wireless download, etc.) additional and/or replacement map-matching models, as new and/or improved map-matching programs become available. The evaluator 336 can receive output of a reconstructed trajectory 335 from the reconstructor 333 and can determine (e.g., calculate mathematically or otherwise using a distortion metric 337) a distortion score 229 of each received reconstructed trajectory 335 relative to an actual trajectory transited by the mobile device.

The actual trajectory transited by the mobile device can be obtained from underlying localization techniques and/or technologies (e.g., only using the localization technology with the smallest magnitude of location measurement error). In some examples, incurred communication costs (e.g., overhead) can be mitigated with an energy-efficient protocol that controls the frequency of sending the location measurement of the mobile device to the LBS provider.

The evaluator 336 can provide the distortion score 339 (e.g., as output of the distortion metric 337) to evaluate the efficacy of the perturbation in reducing the potential adversary's ability to detect that the trajectory has been perturbed and/or in reducing the map-matching ability. The evaluator 336 also can provide feedback 340 to the synthesizer 322. The feedback can, for example, include the distortion score 339, among other usable information, for adjustment of various parameters in the separation tier 324 and/or the conformation tier 326 to improve the efficacy of the perturbation in reducing the potential adversary's ability to detect that the trajectory has been perturbed and/or in reducing the map-matching ability.

In some examples, because the identity of the user of the mobile device can be assumed to be known by a potential adversary, approaches for protecting anonymity (e.g., k-anonymity and entropy-based approaches) are not used. Not using spatial cloaking can rule out metrics such as I-diversity. In contrast, a distortion-based metric (as shown at 337 in FIG. 3) can be a more appropriate metric for evaluating both privacy and QoS in an ALPS. The distortion metric 337 can presume that an adversary performs reconstruction of perturbed trajectory data to which the adversary has gained unauthorized access. The distortion score 339 yielded by the distortion metric 337 by comparison between the reconstructed trajectory 335 and the actual trajectory is usable as a measure of how effective the perturbation is. In some examples, a single reconstructed trajectory with a highest or a lowest determined distortion score can be used as the measure of the efficacy of the perturbation. Euclidean distance, for example, can be used as a distance function in a calculation of per-measurement distortion and trajectory distortion can be defined as an average of per-measurement distortion over the entire trajectory.

The separation tier 324 of the synthesizer 322 can dynamically utilize and take advantage of the varying accuracy levels provided by the different localization technologies. For each location measurement, one localization technology is chosen (e.g., selected). In some examples, the magnitude of perturbation at a macro scale can be controlled with the proportional parameter (PP). The PP can be a set of probabilities specifying a fraction (e.g., a percentage) of an infinite number of total opportunities that each localization technology will be drawn as a source of a location measurement for perturbation of the trajectory.

The probabilistic nature of the PP introduces another level of randomness into the perturbation, making it more difficult for an adversary to generate an accurate estimate of, for example, the noise distribution in the data from switching between the different localization technologies. Without knowledge of the PP, an adversary's best guess about the perturbation may be, for example, a zero mean normal distribution with a standard deviation bounded by an average accuracy of the least accurate localization technology.

The PP can be applied to a per-measurement basis, meaning it is capable of supporting a flexible, personalized privacy preference. Within actual transit of a trajectory, a user can adaptively adjust the PP to maintain a balance between privacy and QoS, according to his privacy profile and accumulative feedback from the reconstructed trace trajectory (e.g., as provided by the reconstructor 333 and the evaluator 336). When there is a conflict between QoS and privacy preferences, some location measurements made by a relatively accurate location technology may still be included in information sent from the mobile device to the LBS provider in a privacy-preserving manner by including the location measurements made by the relatively accurate location technology before, after, and/or between relatively higher perturbation of preceding and/or succeeding location measurements.

In practice, gaps of accuracy and/or granularity of location measurements provided by different localization technologies could be notable by a potential adversary and/or a map-matching model. Applying independent perturbation to each individual location measurement may produce a trajectory with unrealistic transitions (e.g., outliers with exaggerated pulse, freezing, bouncing, etc.). An adversary having accessed the mobility information (e.g., the location measurements) may then have a better chance of estimating the PP in use. This may help the adversary to filter out such outliers to achieve a more accurate reconstruction, as well as making an informed assessment about the user's privacy profile.

Figure 4:
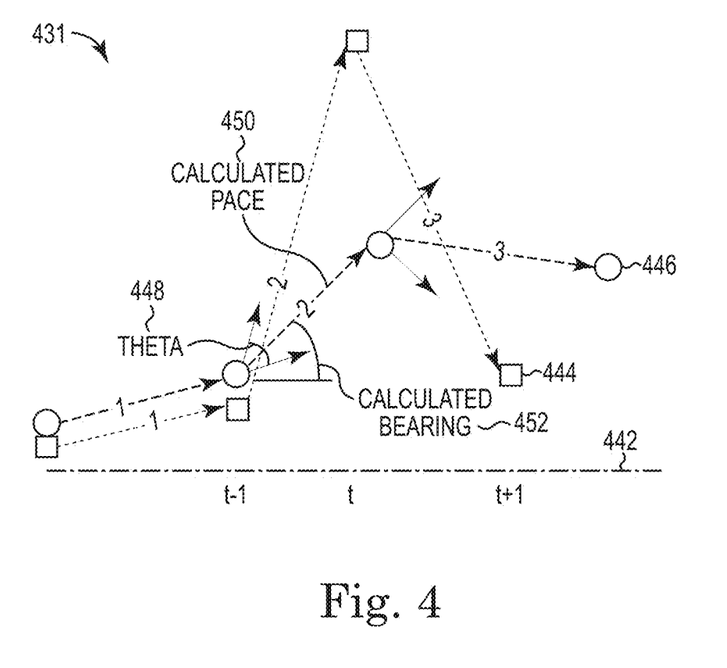
FIG. 4 illustrates an example of a two-tier process for adaptive location perturbation according to the present disclosure.

Accordingly, the conformation tier 326 linked to the separation tier 324 can be used to smoothen the perturbed trajectory 332 prior to being sent to the LBS provider. The conformation tier 326 can introduce an artificial correlation between heavily perturbed samples in order to more closely resemble a trajectory capable of being transited by an actual user of the mobile device, while preserving the original perturbation of the trajectory as much as possible when the perturbation is not unrealistic. An example of operation of the conformation tier 326 in conjunction with the separation tier 324 is shown in FIG. 4.

The reconstruction of the perturbed trajectory described herein is presumed to be automated through utilization of a map-matching model and references to the adversary are interchangeable with references to the map-matching model, where appropriate. In addition to user identity and updates of the perturbed location measurements, an adversary may, in some examples, know and/or acquire one or more of the following items (e.g., side information) to assist in a process of trajectory reconstruction.

The adversary may know about the localization technologies available to a mobile device and the estimated accuracy and/or granularity of each of the localization technologies in regions of interest. That perturbation is being performed may be known to the adversary, but not the specific parameters (e.g., the PP stored in the privacy profile) for the individual run of perturbation. The adversary might have an estimate of a general mobility pattern of a user in the region of interest. For example, parameters such as average speed, a probable limit to the speed obtainable, and/or a time of travel can be estimated through posted speed limits for motor vehicles, potential speeds for walking, jogging, running, bicycle-riding, skateboarding, etc., or obtained from other publicly accessible sources. The adversary could have knowledge of a geographical topology in the region of interest. A variety of maps of the region of interest may be available from various sources (e.g., on-line, among other locations). In some examples, the adversary can focus on a macroscopic trajectory (e.g., a collection of paths that a user has transited). Specifically, if a user stayed indoors in a facility for an arbitrary period of time, the adversary may be more interested in identifying entrance and/or exit trajectories, rather than movements inside the facility.

An adversary who fits into this categorization and who may possess some or all of the aforementioned side information can be termed a map-matching adversary that uses a programmed map-matching model that handles location measurement samples, potentially with large errors, and outputs a reconstructed trajectory. Three different types of map-matching adversary models are described herein as carrying out simulated attacks by formulating reconstructed trajectories 335 based upon the perturbed trajectories 332 in order to estimate the efficacy of the trajectory perturbation. However, more or less than three different types of the map-matching adversaries can be implemented in various examples.

The ALPS described herein is flexible and is capable of plugging in and/or downloading any adversary model 334 (N), as shown in FIG. 3, for use by and/or with the reconstructor 333 and the evaluator 336. The functions utilized by and/or the capabilities of a map-matching adversary may depend on the side-information available. The side information described herein can be extracted from publicly available databases (e.g., OpenStreetMap).

Among the adversary models 334 shown in FIG. 3 is a nearest-road (NR) adversary 334(1) (available using the "Get Direction" function provided by Google Maps). The NR adversary is a basic map-matching technique that is good at handling samples with small error and relatively simple road topology. The NR adversary is effective without using much side-information other than a map (e.g., of roads). Given a perturbed coordinate, the NR adversary can simply place it onto a nearest road segment. This approach may not perform well at reconstruction of trajectories when a magnitude of perturbation is high.

A different adversary model shown in FIG. 3 is a distance-limit (DL) adversary 334(2). The DL adversary applies a travel distance filter before performing the nearest road map-matching. Knowledge of a mobility pattern is used to determine a travel distance threshold. Given the perturbed trajectory, the DL adversary can examine the location measurements individually based on the travel distance threshold. If the travel distance from a preceding measurement exceeds the travel distance threshold, the measurement is considered an outlier that is produced by perturbation and is replaced with an interpolation between the preceding and succeeding measurements.

A third adversary model shown in FIG. 3 is a hidden-Markov-model (HMM) adversary 334(3). The HMM adversary is more sophisticated than the NR adversary and the DL adversary in that the HMM adversary considers not only travel distance, but also a network (e.g., of roads) that regulates a user's trajectory. As the perturbation may introduce relatively large deviations (e.g., errors), the HMM adversary utilizes techniques to handle the large deviations within the context of the network, as described below.

The HMM adversary can have a region of interest that is gridded into an area system. Each area is a square with an edge length approximated by an average speed and sampling interval, for instance, the travel distance during the sampling interval at average speed. Upon the creation of the area system, the perturbed trajectory will first be converted into a sequence of areas.

A transition probability matrix can model the road topology. Given the area system and road information extracted from a map, the HMM adversary first checks the viability of transition between areas and then stores this information as a transition count. A transition count value of 0 is assigned if there is no path connecting them, a transition count value of 2 is assigned if there is a direct path and a transition count value of 1 is assigned if the areas can be connected by a sequence of paths. After creating a transition count matrix, a transition probability for each area can be calculated to denote the transition probability from one area to another area, where a Manhattan distance can define the distance between them. The transition probability is greater if areas are closer to each other and are connected with a fewer number of paths. Calculated transition probabilities are then normalized and recorded in the transition probability matrix.

An emission probability describes a likelihood of a location measurement from an area being observed at all possible areas. Without knowledge of which particular localization technology is used, as well as of corresponding accuracy information, an adversary may be expected to model the emission probability using a normal distribution with respect to distance. The calculation can be simplified by considering the Manhattan distance, which can be approximated to a Euclidean distance based on area size.

Given the transition and the emission probabilities, the HMM can be generated. The observed area sequence and the HMM can then used as input to a Viterbi algorithm to produce a reconstructed area sequence that has a likelihood to closely match the actual trajectory. The Viterbi algorithm is a dynamic programming algorithm for finding a most likely sequence of hidden states (e.g., the Viterbi path) that results in a sequence of events, especially in the context of Markov information sources and HMMs.

An output of the Viterbi algorithm can be a sequence of areas to be converted into sequence of coordinates. A road mapper can find representative coordinates for each area in the sequence by first converting the area sequence to a sequence of road segments that have a low (e.g., smallest) number of segments. As each area is matched to a road segment, the road mapper can then examine coordinates traversed by this road segment. The coordinates that are close (e.g., closest) to the corresponding coordinate in the perturbed trajectory can be used to represent the area in the reconstructed trajectory. The just-described HMM approach may introduce its own errors depending on detail of the map data.

FIG. 4 illustrates an example of a two-tier process for adaptive location perturbation according to the present disclosure. The example of the two-tier process 441 illustrated in FIG. 4 shows the actual trajectory 442 represented by a horizontal straight line, whereas the sequence of hollow squares 444 represents outputs of the separation tier (e.g., as shown at 324 in FIG. 3) with varying magnitudes of perturbation and the sequence of hollow circles 446 represents outputs of the conformation tier (e.g., as shown at 326 in FIG. 3). As described herein, perturbation of the location measurements can be contributed to by selection from the plurality of localization technologies and/or subsequent modification of the perturbed location measurements by creation of a conformed location measurement.

The first two samples forming the endpoints of segment 1 of the perturbed trajectory up until time instance t−1 can be utilized as output from the conformation tier directly from the output of the separation tier because the output of the separation tier is within an acceptable threshold (e.g., of deviation) from the actual trajectory 442. However, the output of the separation tier at time instance t is not within the acceptable threshold from the actual trajectory 442 and/or the output of the separation tier at time instances t−1 and/or t+1.

To create a conformed location measurement at time instance t, the conformation tier can use preceding and/or succeeding perturbed location measurements from the separation tier as seed, along with preceding and/or succeeding conformed location measurements. With this information, a calculated pace 450 (e.g., travel distance) and a calculated bearing 452 (e.g., turning direction) can be calculated to determine a conformed trajectory for segment 2.

A calculated pace (e.g., as shown at 450) can be generated for each area of interest by assigning a default pace calculated using an average speed in the area. For example, a travel distance from time instance t−1 to time instance t, corresponding to segment 2, can be derived. The travel distance can be influential in the context of personalized privacy because, for instance, short distances and dense location measurements in an actual trajectory may suggest a prolonged stay in a facility (e.g., dwelling) and a potential sensitivity to the user. A separation tier can obscure this dwelling in a sensitive area by making larger and/or more frequent perturbations, while transit through and/or dwelling within insensitive areas may remain intact (e.g., relatively unperturbed). This trait can be preserved at the conformation tier.

A density threshold, for example, defined by a user's privacy preference about a size range of a sensitive area as well as the user's past mobility patterns, can be used to determine a consequence of a density determination. When a density determination exceeds the threshold, which may suggest that the user is in a normal movement pattern or that the user is in a sensitive area but perturbed by the separation tier, a pace calculation can assign the default pace.

When a density determination is below the threshold, which may suggest a possible stay in an insensitive area, the pace calculation can determine a travel distance, for example, from time instance t−1 to time instance t, corresponding to segment 2. A distance limit threshold can be defined according to an average speed limit in that area. If the distance limit threshold is not violated, the determined travel distance can be assigned by the conformation tier in order to converge to separation tier location measurements or to remain close to them. If the distance limit threshold is violated, the default pace can be assigned by the conformation tier.

A calculated bearing (e.g., as shown at 452) can be generated, for example, from time instance t−1 to time instance t, corresponding to segment 2. The calculated bearing can record a bearing from a previous segment (e.g., up until time instance t−1, corresponding to segment 1) and a new bearing can be calculated for a next segment (e.g., from time instance t−1 to time instance t, corresponding to segment 2). The turning angle theta 448 between a preceding conformed trajectory (e.g., corresponding to segment 1) and a succeeding separation tier location measurement for the next segment (e.g., corresponding to segment 2) determines an expected bearing.

The objective of the calculated bearing (e.g., as shown at 452) is to smoothen abrupt angular transitions at each location measurement to make the angular transitions conform more closely to a realistic trajectory (e.g., to reduce a potential adversary's ability to detect the perturbation of the trajectory and/or the user's personalized privacy profile settings). For example, the conformation tier can be programmed to substitute a sequence of 90 degree turns for sharp turns (e.g., with acute angles) and/or U turns (e.g., reversals in direction) caused by separation tier perturbations and/or measurement errors because 90 degree turns are more common and/or realistic (e.g., in road networks). In addition, if theta is greater than 90 degrees the conformation tier can be programmed to reduces the calculated bearing to 90 degrees or to reduce the calculated bearing to half of theta to smoothen the turn, among a variety other conforming activities executable by the conformation tier in the context of the ALPS described herein.

Alternatives to the just-described two-tier perturbation process can be implemented by the ALPS described herein. For example, a Gaussian perturbation process can be used to perturb each location measurement independently by introducing a displacement that is created with a turning direction (e.g., uniformly chosen from $(-\pi, \pi)$) and a perturbing distance that follows an independent and identically distributed (I.I.D) Gaussian distribution (e.g., such as $N(0,\sigma^2_\rho)$), where each random variable has the same probability distribution as the others and all are mutually independent. A magnitude of perturbation can be controlled with parameter, such as $\sigma_\rho$. In some examples, a process consistent with the previously described separation tier can create the perturbed trajectory by itself. Such perturbation can, for example, be controlled by applying the proportional parameter (PP). In some examples, a process consistent with the previously described conformation tier can create the perturbed trajectory by itself. Such perturbation can, for example, be controlled by applying a pace calculation parameter.

Figure 5:
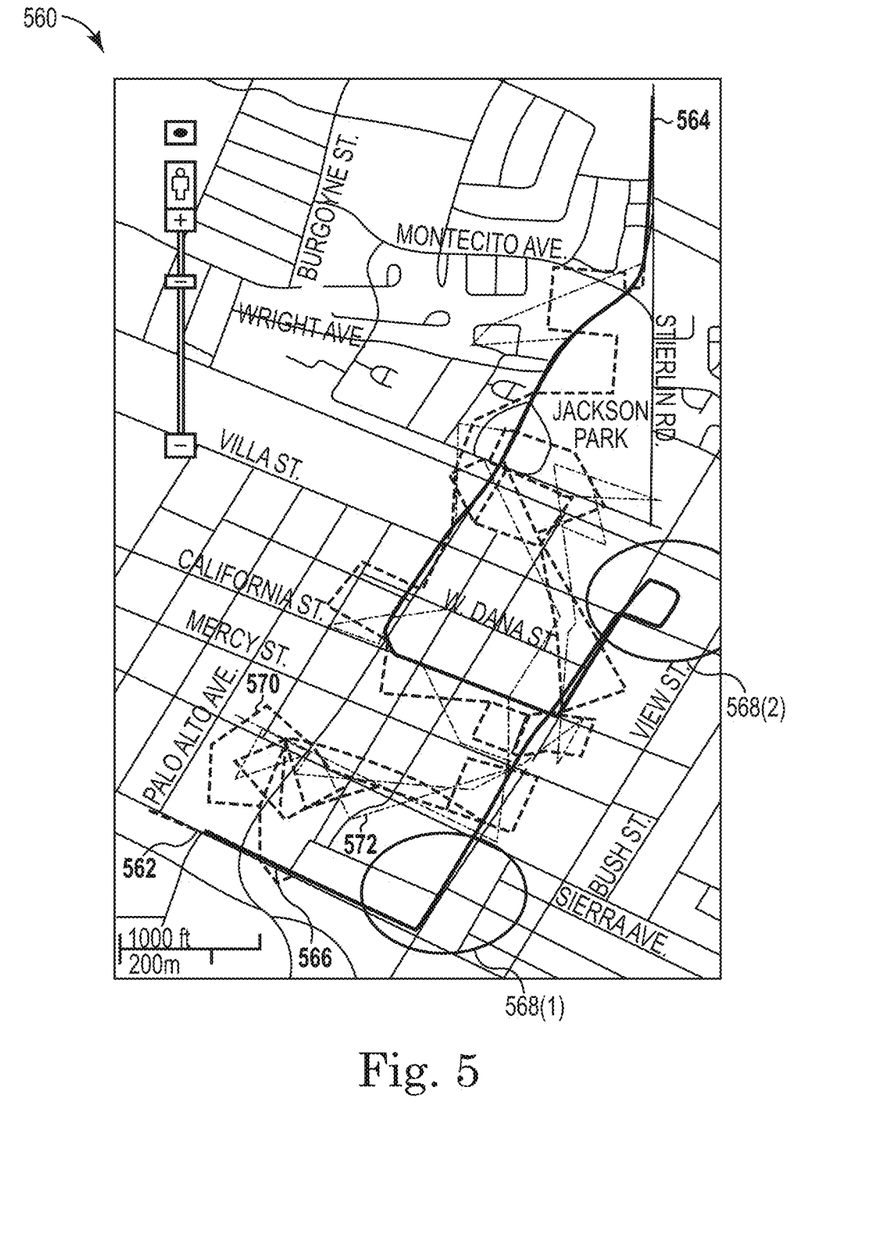
FIG. 5 illustrates an example of implementation of adaptive location perturbation according to the present disclosure.

FIG. 5 illustrates an example of implementation of adaptive location perturbation according to the present disclosure. The example of implementation 560 illustrated in FIG. 5 shows an actual trajectory 566, a perturbed trajectory 570, and a reconstructed trajectory 572 superimposed on a map showing a network of roads. The actual trajectory 566 has a start point 562 and an end point 564. The example of implementation 560 shows two areas 568(1) and 568(2) determined to be sensitive by the user (e.g., as determined by settings in a personalized privacy preference profile, as described herein).

As such, a trajectory having an increased magnitude of perturbation (e.g., as shown in the perturbed trajectory at 570) will be sent (e.g., transmitted) from the mobile device (not shown) to the LBS provider (not shown) when the mobile device actually transits either one of the sensitive areas 568(1) and 568(2) (e.g., as shown in the actual trajectory at 566). In various examples, the perturbed trajectory can avoid intersection with an area determined to be sensitive (e.g., as shown in FIG. 5), or can spend less time in an area determined to be sensitive and/or cover less distance in an area determined to be sensitive than recorded by the actual trajectory. When the mobile device, thus the user, transits out of a sensitive area, the perturbed trajectory can converge to more closely reflect the actual trajectory. This enables enforcement of personalized privacy during transit of sensitive areas while otherwise maintaining QoS (e.g., as guaranteed by an LBS provider).

The reconstructed trajectory 572 shown in FIG. 5 can represent a simulated attack by a potential adversary. For example, the attack can be simulated by the reconstructor 333 shown in FIG. 3 using one or more map-matching adversary model (e.g., as shown at 334(1), 334(2), 334(3), and/or 334(N)). An estimate of the accuracy of such a simulated attack in being able to yield a reconstructed trajectory similar to the actual trajectory based upon deciphering the perturbed trajectory can be provided by the evaluator 336 shown in FIG. 3 (e.g., as the distortion score 339).

The example graphic illustration shown in FIG. 5 indicates the simulated attack yielding a reconstructed trajectory 572 consistent with the perturbed trajectory 570 (e.g., in that the reconstructed trajectory 572 also does not intersect the sensitive areas 568(1) and 568(2)). By using the map-matching adversary models (e.g., stored in the reconstructor 333), which can, in some examples, be updated and/or added to, the user can have increased confidence that a potential adversary will have a reduced likelihood of detecting the user's presence in sensitive regions. The reduced likelihood can result from, for example, perturbation of the actual trajectory using a synthesizer 322 as shown in FIG. 3 either with a single separation tier 324 or by combination of the separation tier 324 and a conformation tier 326 in a smoothened two-tier process.

Accordingly, as described herein, an ALPS can include a non-transitory machine-readable medium for storing program instructions for adaptive location perturbation. Such instructions can, for example, be executable by a processing resource to enable a mobile communication device to adaptively switch between a plurality of localization technologies to perturb at least one of a plurality of locations measured by the plurality of localization technologies during transit of a trajectory by the mobile communication device. The instructions can be executable by a processing resource to transmit (e.g., by a transmitter, a transceiver, etc.) the plurality of measured locations transited by the mobile communication device to a device (e.g., a receiver, a transceiver, etc.) of an LBS provider.

The instructions can, in some examples, be executable by a processing resource to probabilistically select between the plurality of localization technologies for at least one location measurement based upon an adaptively assigned percent chance that each of the localization technologies will be selected. The probabilistic selection can, for example, be based upon a probabilistic parameter (PP), as described herein (e.g., as stored in a personalized privacy preference portfolio).

The instructions can, in some examples, be executable by a processing resource to smoothen a directional transition in a perturbed trajectory prior to sending a smoothened perturbed trajectory to the device of the LBS provider (e.g., to mitigate detectability of perturbation of the trajectory by a potential adversary). The instructions can, in some examples, be executable by a processing resource to simulate a potential adversary map-matching (e.g., utilizing an automated map-matching model, as described herein) a perturbed trajectory transmitted by the mobile communication device to determine efficacy of perturbation of the at least one of the plurality of locations in reduction of an ability to accurately map-match an actual transited trajectory. The simulation presumes that the potential adversary has access to trajectory information after the perturbation (e.g., by intercepting transmission of the location measurements, by the adversary gaining unauthorized access to the LBS provider, and/or the adversary being the untrusted LBS provider, among other ways of accessing the perturbed trajectory information).

Figure 6:
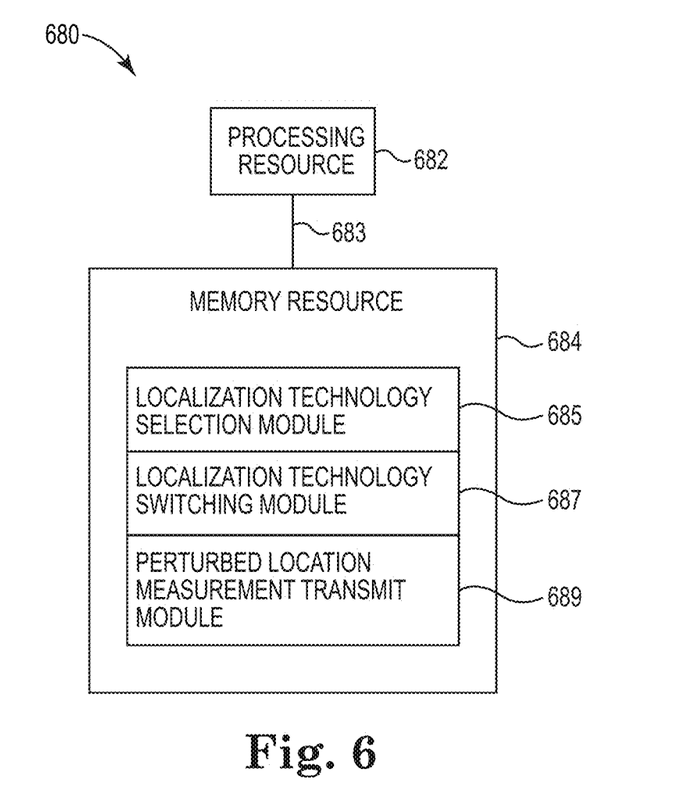
FIG. 6 illustrates an example of a computing system for adaptive location perturbation according to the present disclosure.

FIG. 6 illustrates an example of a computing system for adaptive location perturbation according to the present disclosure. The example of the computing system 680 illustrated in FIG. 6 shows a block diagram including an example of a processing resource 682 and a memory resource 684 for adaptive location perturbation according to the present disclosure. In various examples, the processing resource 682 and the memory resource 684 can be integral to the mobile device described herein or one and/or the other, or portions thereof, can be located elsewhere (e.g., in the cloud). The processing resource 682 and the memory resource 684 can be local to a computing network, such as on a router. The memory resource 684 (e.g., a tangible, non-transitory medium) can store a set of machine-readable program instructions (e.g., stored on software, firmware, and/or hardware, etc.) executable by the processing resource 682. The memory resource 684 may be integrated in a single device or distributed across multiple devices. The memory resource 684 may be fully or partially integrated in the same device as the processing resource 682 or it may be separate from but accessible to the device of the processing resource 682 (e.g., via a wired or wireless communication path 683). The memory resource 684 can be local to a router or remote therefrom. For those examples in which the memory resource 684 is remote from the router, the instructions can be loaded into the memory resource of the router.

Memory resource 684 can be in communication with a number of processing resources of more or fewer than that shown at 682. The processing resources 682 can be in communication with a tangible non-transitory memory resource 684 storing a set of machine-readable instructions (MRI) executable by the processing resource 682, as described herein. The MRI can include a number of modules, for example, modules 685, 687, and 689. The MRI can also be stored in remote memory managed by an ALPS server and can include an installation package such that the MRI can be downloaded, installed, and executed.

Processing resource 682 can execute the MRI that can be stored on an internal or external non-transitory memory resource 684. The processing resource 682 can execute the MRI to perform various functions, including the functions described with regard to FIGS. 1-5. For example, the processing resource 682 can execute MRI to implement the example system for adaptive location perturbation illustrated FIG. 3.

The number of modules (e.g., modules 685, 687, and 689) can include MRI that, when executed by the processing resource 682, can perform a number of functions. A number of modules can be sub-modules of other modules. For example, a localization technology selection module 685, a localization technology switching module 687 and/or a perturbed location measurement transmit module 689 can be sub-modules contained within a synthesizer module, as shown at 322 in FIG. 3. In some examples, the number of modules can comprise individual modules on separate and distinct memory resources and/or computing devices.

The localization technology selection module 685 can include MRI that when executed by the processing resource 682 can cause the mobile device (e.g., as shown at 105 in FIG. 1) and/or the ALPM (e.g., as shown at 106 in FIG. 1) to select from a plurality of accessible localization technologies (e.g., as shown at 102 in FIG. 1). The plurality of localization technologies can individually have different ranges (e.g., overlapping or non-overlapping ranges) of intrinsic location measurement errors to enable adaptive location perturbation, as described herein.

The localization technology switching module 687 can include MRI that when executed by the processing resource 682 can switch from a selected localization technology module 685 to a different one of the plurality of localization technologies based, for example, on settings of a privacy profile indicative of a user's privacy preferences stored in memory, as described herein.

The perturbed location measurement transmit module 689 can include MRI that when executed by the processing resource 682 can cause transmission (e.g., wired or wirelessly) of the perturbed trajectory (e.g., through the insecure channel shown at 107 in FIG. 1) to an LBS provider (which may be "untrusted", as described with regard to the LBS provider 108 shown in FIG. 1). The perturbed trajectory may, in some examples, be the same as the perturbed trajectory 332 shown in FIG. 3 or the perturbed trajectory may have been adjusted based on feedback (e.g., as shown at 340 in FIG. 3) based upon comparison to a reconstructed trajectory (e.g., as shown at 335 in FIG. 3). Comparison to the feedback can, in various examples, be performed by creating one or more reconstructed trajectories (e.g., by the reconstructor 333 running a number of map-matching adversary models, as shown in FIG. 3) and evaluating the one or more reconstructed trajectories (e.g., by the evaluator 336 using a distortion metric 337 and outputting a distortion score 339, as shown in FIG. 3).

The memory resource 684, as described herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, as well as other types of computer-readable media.

The memory resource 684 can be integral, or communicatively coupled, to a computing device, in a wired and/or a wireless manner. For example, the memory resource 684 can be an internal memory, a portable memory, a portable disk, or a memory associated with another computing resource (e.g., enabling MRIs to be transferred and/or executed across a network).

The memory resource 684 can be in communication with the processing resources 682 via the communication path 683. The communication path 683 can be local or remote to a machine (e.g., a computer) associated with the processing resources 682. Examples of a local communication path 683 can include an electronic bus internal to a machine (e.g., a computer) where the memory resource 684 includes one or more of volatile, non-volatile, fixed, and/or removable storage media in communication with the processing resource 682 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 683 can be such that the memory resource 684 is remote from the processing resource 682, such as in a network connection between the memory resource 684 and the processing resource 682. That is, the communication path 683 can be a network connection. Examples of such a network connection can include a local area network (LAN), wide area network (WAN), personal area network (PAN), the cloud, and the Internet, among others. In such examples, the memory resource 684 can be associated with a first computing device and the processing resources 682 can be associated with a second computing device (e.g., a Java® server). For example, a processing resource 682 can be in communication with a memory resource 684, where the memory resource 684 includes a set of instructions and where the processing resource 682 is designed to carry out the set of instructions.

Accordingly, the processing resource 682 coupled to the memory resource 684 can execute MRI to cause a mobile communication device (e.g., via an ALPM) to adaptively switch between a plurality of localization technologies to perturb a location measurement of the mobile communication device and transmit the perturbed location measurement of the mobile communication device to an LBS provider.

In various examples, the mobile communication device can include a profile (e.g., a personalized privacy preference profile) that can be adaptively adjustable for location measurement perturbation (e.g., magnitudes and/or frequency thereof) in selected mapped areas to achieve a balance between the perturbation (e.g., privacy) and QoS of the LBS for the mobile communication device (e.g., during potential tracking of a potential trajectory transited by the mobile communication device). In various examples, the mobile communication device can include a profile (e.g., a personalized privacy preference profile) that can be adaptively adjustable to vary a percent chance of selection of at least one of the plurality of localization technologies for measurement of the location of the mobile communication device in at least one selected mapped area (e.g., during potential tracking of a potential trajectory transited by the mobile device). In some examples, one or more of the profiles just described can be stored as MRI in a module of the memory resource 684 that when executed by the processing resource 682 can cause the mobile communication device to perform the described functions.

In various examples, the mobile communication device can itself include (e.g., have hosted at) or can be connected with (e.g., in a wired or wireless manner) a feedback functionality to present a record of unperturbed (e.g., actual) and perturbed location measurements of the mobile communication device. The record can enable adaptive adjustment of at least one of preceding perturbations and succeeding perturbations (e.g., by changing a percent chance of selection of at least one of the plurality of localization technologies).

The adaptive adjustment can serve to affect a balance between perturbation (e.g., privacy) and QoS, a desired level of user privacy, to reduce detectability of perturbation of the trajectory by a potential adversary, and/or to reduce a likelihood of a potential adversary being able to reconstruct a trajectory that accurately traces an actual trajectory transited by the mobile communication device, among other effects of the adaptive adjustment. In some examples, the feedback can include evaluation of the accuracy (e.g., via the distortion score 339 shown in FIG. 3) of one or more reconstructed trajectories created by a number of map-matching adversary models during a simulated attack by a potential adversary. In some examples, the feedback functionality just described can be stored as MRI in a module of the memory resource 684 that when executed by the processing resource 682 can cause the mobile communication device to perform the described functions.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for adaptive location perturbation, comprising:
   selecting, by a processing resource of a mobile device executing instructions stored on a non-transitory medium, between a plurality of localization technologies to perturb a plurality of locations measured by the mobile device;
   smoothen a directional transition of the mobile communication device by smoothening at least one of the perturbed locations to create a smoothened perturbed trajectory; and
   sending the smoothened perturbed trajectory and the perturbed location measurements of the mobile device to a location-based service provider.

2. The method of claim 1, wherein selecting between the plurality of localization technologies comprises adaptively selecting between localization technologies that have differing magnitudes of location measurement error.

3. The method of claim 2, wherein selecting between the plurality of localization technologies comprises context-aware selecting to increase perturbation of the location measurement of the mobile device in a selected location.

4. The method of claim 3, wherein selecting between the plurality of localization technologies comprises increasing a magnitude of the location measurement perturbation in the selected location.

5. The method of claim 3, wherein selecting between the plurality of localization technologies comprises increasing a probability of a location measurement in the selected location by a localization technology having a relatively high magnitude of location measurement error.

6. The method of claim 1, comprising adaptively switching between the plurality of localization technologies to perturb at least one of the plurality of locations measured by the plurality of localization technologies during transit of a trajectory by the mobile device.

7. The method of claim 1, comprising controlling at least one of a frequency of adaptively switching between the plurality of localization technologies and a frequency of sending a location measurement of the mobile device to the location-based service provider to mitigate incurred communication costs.

8. A system for adaptive location perturbation, comprising:
   a mobile communication device comprising;
      a processing resource; and
      a memory resource communicatively coupled to the processing resource, the memory resource storing machine-readable instructions executable by the processing resource to;
         adaptively switch between a plurality of localization technologies to perturb a plurality of location measurements of the mobile communication device;
         smoothen a directional transition of the mobile communication device by smoothening at least one of the perturbed locations to create a smoothened perturbed trajectory; and
         transmit the smoothened perturbed trajectory and the perturbed location measurements of the mobile communication device to a location-based service provider.

9. The system of claim 8, wherein the mobile communication device comprises a profile adaptively adjustable for location measurement perturbation in selected mapped areas to achieve a balance between the perturbation and quality of service for the mobile communication device.

10. The system of claim 8, wherein the mobile communication device comprises a profile adaptively adjustable to vary a percent chance of selection of at least one of the plurality of localization technologies for measurement of the location of the mobile communication device in at least one selected mapped area.

11. The system of claim 8, comprising a feedback functionality to present a record of unperturbed and perturbed location measurements of the mobile communication device and to enable adaptive adjustment of at least one of preceding perturbations and succeeding perturbations.

12. The system of claim 8, wherein each of the plurality of localization technologies have differing magnitudes of location measurement error.

13. The system of claim 8, wherein adaptively switching between the plurality of localization technologies comprises context-aware switching to increase perturbation of the location measurement of the mobile communication device in a selected location.

14. A non-transitory machine-readable medium storing program instructions for adaptive location perturbation, the instructions being executable by a processing resource to:
   enable a mobile communication device to adaptively switch between a plurality of localization technologies to perturb at least one of a plurality of locations measured by the plurality of localization technologies during transit of the mobile communication device;

smoothen a directional transition of the mobile communication device by smoothening at least one perturbed location to create a smoothened perturbed trajectory; and transmit the smoothened perturbed trajectory and the plurality of measured locations transited by the mobile communication device to a device of a location-based service provider.

15. The medium of claim 14, comprising to probabilistically select between the plurality of localization technologies for at least one location measurement based upon an adaptively assigned percent chance that each of the localization technologies will be selected.

16. The medium of claim 14, comprising to simulate a potential adversary map-matching the smoothened perturbed trajectory transmitted by the mobile communication device to determine efficacy of perturbation of the at least one of the plurality of locations in reduction of an ability to accurately map-match an actual transited trajectory.

17. The medium of claim 14, wherein each of the plurality of localization technologies have differing magnitudes of location measurement error.

18. The medium of claim 14, wherein adaptively switching between the plurality of localization technologies comprises context-aware switching to increase perturbation of the location measurement of the mobile device in a selected location.

19. The medium of claim 18, wherein adaptively switching between the plurality of localization technologies comprises increasing a magnitude of the location measurement perturbation in the selected location.

20. The medium of claim 18, wherein adaptively switching between the plurality of localization technologies comprises increasing a probability of a location measurement in the selected location by a localization technology having a relatively high magnitude of location measurement error.

* * * * *